US009422015B1

(12) United States Patent
Fraley et al.

(10) Patent No.: US 9,422,015 B1
(45) Date of Patent: Aug. 23, 2016

(54) EXTENDABLE TRUCK CHASSIS WITH ROLLER BOGIE

(71) Applicant: King Kutter, Inc., Winfield, AL (US)

(72) Inventors: J. Phillip Fraley, Winfield, AL (US); John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 262 days.

(21) Appl. No.: 13/975,321

(22) Filed: Aug. 24, 2013

Related U.S. Application Data (60) Provisional application No. 61/837,172, filed on Jun. 20, 2013.

(51) Int. Cl.
*B62D 63/06* (2006.01)

(52) U.S. Cl.
CPC .................... *B62D 63/061* (2013.01)

(58) Field of Classification Search
CPC .. B62B 63/061; B62B 53/067; B62B 53/068; B62B 21/14; B60P 1/52
See application file for complete search history.

(56) References Cited

U.S. PATENT DOCUMENTS

| | | | | |
|---|---|---|---|---|
| 3,239,274 A | * | 3/1966 | Weiss ..................... | B62D 21/14 280/656 |
| 3,372,946 A | * | 3/1968 | Hutchens ................. | B60P 1/52 280/149.2 |
| 3,561,622 A | | 2/1971 | Dioguardi et al. | |
| 4,286,906 A | | 9/1981 | Robertson | |
| 4,318,656 A | | 3/1982 | Ezell | |
| 4,362,317 A | * | 12/1982 | Brockman .......... | B62D 53/067 280/656 |
| 4,580,805 A | * | 4/1986 | Bertolini ............. | B62D 53/067 280/149.2 |
| 4,593,810 A | * | 6/1986 | Cook ..................... | B60P 1/52 198/781.01 |
| 4,626,162 A | | 12/1986 | Parisi | |
| 4,635,742 A | * | 1/1987 | Bertolini ............. | B62D 53/067 180/209 |
| 4,955,629 A | * | 9/1990 | Todd, Jr. ............. | B62D 53/067 280/407 |
| 4,958,845 A | * | 9/1990 | Parks ................... | B62D 53/068 280/149.2 |
| 4,969,659 A | * | 11/1990 | Ehrlich ............... | B62D 53/067 280/407.1 |
| 5,232,234 A | * | 8/1993 | McCombs ........... | B62D 53/067 280/149.2 |

(Continued)

FOREIGN PATENT DOCUMENTS

| | | |
|---|---|---|
| DE | 102010046083 A1 | 3/2012 |
| EP | 0809577 A1 | 3/1966 |

(Continued)

*Primary Examiner* — Katy M Ebner
(74) *Attorney, Agent, or Firm* — The Gache Law Firm, P.C.; Russell C. Gache (57) ABSTRACT

A trailer chassis having a lower frame or roller bogie undergirding an upper frame may be extended to adjust the length of the trailer chassis in response to the weight of a shipping container being transported. The roller bogie is slidably coupled to the upper frame along two side support tubes which have locking assemblies to allow for the locking of the bogie to the upper frame with a dual sided, retractable locking pin. Each side support tube includes a plurality of opposing rollers embedded within each tube and has an upper rotating surface that protrudes through the top surface of the support tube so that as the bogie may be freely moved backwards or forwards relative to the upper frame and can be locked into an extended or retracted position. The movement of the bogie does not affect the position of a shipping container locked onto the chassis because the bogie movement is completely under and independent from the flatbed portion of the chassis supporting a shipping container. By extending the bogie relative to the upper chassis frame, the truck chassis may be adjusted to accommodate a heavier container weight and meet state transportation regulations.

22 Claims, 8 Drawing Sheets

(56) References Cited

U.S. PATENT DOCUMENTS

| | | | |
|---|---|---|---|
| 5,237,784 A | 8/1993 | Ros | |
| 5,419,577 A * | 5/1995 | Murray | B60P 3/06 280/656 |
| 5,507,514 A * | 4/1996 | Jacques | B62D 53/068 280/407.1 |
| 5,611,570 A * | 3/1997 | Garcia | B62D 21/02 280/789 |
| 5,758,890 A * | 6/1998 | Wessels | B62D 53/067 280/149.2 |
| 5,924,754 A * | 7/1999 | Kuhns | B62D 21/14 296/184.1 |
| 6,186,533 B1 * | 2/2001 | Alaniz | B62D 21/04 280/656 |
| 6,422,372 B2 * | 7/2002 | Ransil | B60P 1/52 193/35 R |
| 6,969,104 B2 * | 11/2005 | Green | B60P 1/6481 280/656 |
| 7,658,397 B2 * | 2/2010 | Mattson | B62D 21/14 280/407 |
| 7,677,625 B2 * | 3/2010 | Gosselin | B62D 21/14 280/785 |
| 7,802,958 B2 * | 9/2010 | Garcia | B60P 1/52 414/482 |
| 7,845,700 B2 * | 12/2010 | Gosselin | B60P 3/40 280/149.2 |
| 8,152,200 B2 * | 4/2012 | Murray | B62D 21/20 280/149.2 |
| 8,272,654 B2 * | 9/2012 | Xie | B62D 53/067 180/209 |
| 8,353,523 B2 * | 1/2013 | Pedersen | B60P 3/40 280/404 |
| 2013/0266412 A1 * | 10/2013 | Young | B60P 1/52 414/537 |

FOREIGN PATENT DOCUMENTS

| | | |
|---|---|---|
| EP | 2431222 A2 | 3/2012 |
| WO | 9625302 A1 | 8/1996 |
| WO | 0010834 | 3/2000 |

* cited by examiner

EXTENDABLE TRUCK CHASSIS WITH ROLLER BOGIE

This application claims the benefit of filing priority under 35 U.S.C. §119 and 37 C.F.R. §1.78 of the U.S. Provisional Application Ser. No. 61/837,172 filed Jun. 20, 2013, for an Extendable Truck Chassis with Roller Bogie. All information disclosed in that prior provisional application is incorporated herein by reference

FIELD OF THE INVENTION

The present invention relates generally to truck chassis. In greater particularity, the present invention relates to vehicle chassis that are extendable. In even greater particularity, the present invention relates to vehicle chassis that have an extendable bogie.

BACKGROUND OF THE INVENTION

Tractor-trailer truck systems vary in length and configuration depending upon the continent upon which the truck operates and depending upon what type of cargo is being hauled. In North America the most common type of truck for hauling purposes, and the type most commonly viewed by motorists is the semi-tractor trailer type of truck, also known as the "18 Wheeler" or simply as a "Semi." Semi's have been immortalized in many country western songs as written by the likes of Willie Nelson and Ronnie Millsap (e.g. Smoke Mountain Rain), and are part of the highway culture of America.

The Semi is a trailer without a front axle in which a large proportion of the overall weight of the trailer weight is supported by a road tractor, which is a motorized detachable front axle assembly having a "cab" in which a driver positions him/herself to operate the Semi. The tractor is designed to pull a trailer laden with heavy cargo over great distances and deposit "hauled" cargo at a destination point, and to usually then pick-up another trailer having more cargo. A semi-trailer is also normally equipped with "landing gear" which are a set of legs positioned toward the front of the trailer and which can be lowered to support the trailer when uncoupled from the tractor. This allows the trailer to be uncoupled from a tractor and left at is destination for unloading and loading of cargo which can then be hauled by a different tractor.

One issue that faces Semi transportation companies is in what type and size/configuration of trailer should it invest. The most common type of trailer is a "box" or "van" trailer. In North America box trailers have standardized lengths of 28 ft 0 in (8.53 m), 32 ft 0 in (9.75 m), 34 ft 0 in (10.36 m), 36 ft 0 in (10.97 m), 40 ft 0 in (12.19 m), 45 ft 0 in (13.72 m), 48 ft 0 in (14.63 m) and 53 ft 0 in (16.15 m). Other types of trailers also exist, such as a "bus" type; a "curtain sider" semi-trailer; a "flatbed" trailer, which is a type of drop-deck trailer; a "double decker" which has a fixed, hinged or moveable second floor to enable it to carry palletized goods; "dry bulk" trailers that resemble big tankers and are used for hauling dry-goods such as sugar, and flour; a "hopper-bottom" trailer, which is usually used to haul grain; a "livestock" trailer; a "lowboy" trailer which is a type of flatbed trailer in which the load floor is positioned very close to the ground and typically used for heavy equipment such as cranes, bulldozers, etc.; a "reefer" or refrigerator trailer; or a tanker trailer used for hauling liquids such as gasoline, milk, orange juice, and alcohol.

The flatbed trailer is very common site on most interstate highways and consists of a load floor, removable side rails, and sometimes includes a bulkhead on its front to protect the tractor in the event of a load shift. Flatbeds also are commonly configured to receive and haul intermodal containers, sometimes referred to as ISO containers, or shipping containers, A shipping container is a standardized reusable steel box used for the safe, efficient and secure storage and movement of materials and products within a global containerized intermodal freight transport system. They are called "intermodal" because they can be transported on ships, trains, and trucks easily due to standardized size and connection mechanisms. When a freight ship containing a number of shipping containers arrives at a port location, the containers are generally removed by automated crane systems and loaded onto train cars (e.g. a flatcar) or onto a flatbed truck chassis. Each shipping container includes as part of its structure a "twist-lock" receptacle, generally at each corner of the container. The rail cars or truck chassis are configured to support these shipping containers on a flatbed floor or on transverse supporting beams, depending upon the particular configuration of the chassis or railcar, and a twist-lock affixed to the railcar or truck chassis locks each container in place. In case of a truck chassis, twist locks are generally welded onto the chassis support structure near the outer perimeter of the chassis.

However, while shipping containers shipped via truck generally have a standardized size, state regulations vary across North America as to what length of truck chassis must be used for each container being transported, depending upon the weight of each container. A shipping container can be loaded with heavy items, such as large motors or heavy machine parts, thereby sometimes exceeding the weight of the entire semi-trailer. So, some states require that chassis lengths be extended by as much as 15 feet so that the distance between the rear set of wheels and the rear set of wheels of the truck tractor separate the weight over a larger distance. The larger separation reduces the total supportive weight a bridge endures as a truck travels over the bridge by distributing a greater portion of the total truck weight over a greater length of bridge or onto an adjoining roadbed. This can be especially helpful for a relatively short bridge and may allow the structural requirements of a relatively short bridge to be reduced.

Unfortunately, permanently lengthening a truck chassis is less than ideal for hauling goods because shipping containers must generally be positioned toward the middle to the front of a chassis for weight distribution and driving concerns, thereby leaving a wide gap between the end of the shipping container and the end of the chassis. This gap complicates unloading because most trucks back their chassis down into a loading dock that allows for the bed of the chassis, and therefore the shipping container floor, to be positioned flush with the loading dock concrete floor. When flush, the shipping container doors may be opened and workers gain direct access to the goods within the container. Also, some of these goods may be quite heavy and require a loading fork to be used to remove them. Loading forks are relatively heavy and require a firm support such as is generally present at a concrete loading dock.

In response, several attempts have been made to design flatbed and other trailer types to be reconfigurable to adapt to the length of a flatbed to accommodate various sizes of loads being transported. For example, flatbed trailers have been designed to be extendable, such as described in patent publication no. EP0551159 A1 which discloses a trailer with curtain sides and a top with a flatbed floor in two sections. The floor sections are centrally supported on an extendable box-within-a-box chassis, with the forwards floor section sliding over the rearwards floor section as the trailer is retracted. Such a trailer may be loaded by a separate crane or by a forklift truck.

A flatbed trailer was designed by Raven (International Publication WO 00/10834) which allowed the trailer to be extended while connected to and towed by a tractor unit. Raven's trailer included a chassis section with a load bearing first floor surface, supported by a wheeled bogie section. The bogie section provided a second platform for a load bearing second floor surface while being slidably connected to the chassis section.

However, while these and other examples provide for the lengthening of a truck chassis responsive to load size and weight factors, they do not evenly distribute load weight on the wheeled bogie as it extends or retracts. Hence, what is needed is an improved design for an extendable chassis trailer using a roller supported, wheeled bogie.

SUMMARY OF THE INVENTION

The present invention is an extendable trailer chassis having a lower frame or roller bogie undergirding an upper frame. The roller bogie is slidably coupled to the upper frame along two side support tubes which have locking assemblies to allow for the locking of the bogie to the upper frame with a dual sided, retractable locking pin. Each side support tube includes a plurality of opposing rollers embedded within each tube and having an upper rotating surface that protrudes through the upper surface of the support tube so that the bogie may be freely moved backwards or forwards relative to the upper frame into an extended or retracted position. The movement of the bogie does not affect the position of a shipping container locked onto the chassis because the bogie movement is completely under and independent from the flatbed portion of the chassis supporting the shipping container.

Other features and objects and advantages of the present invention will become apparent from a reading of the following description as well as a study of the appended drawings.

BRIEF DESCRIPTION OF THE DRAWINGS

An extendable trailer chassis incorporating the features of the invention is depicted in the attached drawings which form a portion of the disclosure and wherein.

DESCRIPTION OF THE PREFERRED EMBODIMENTS

Figure 1:
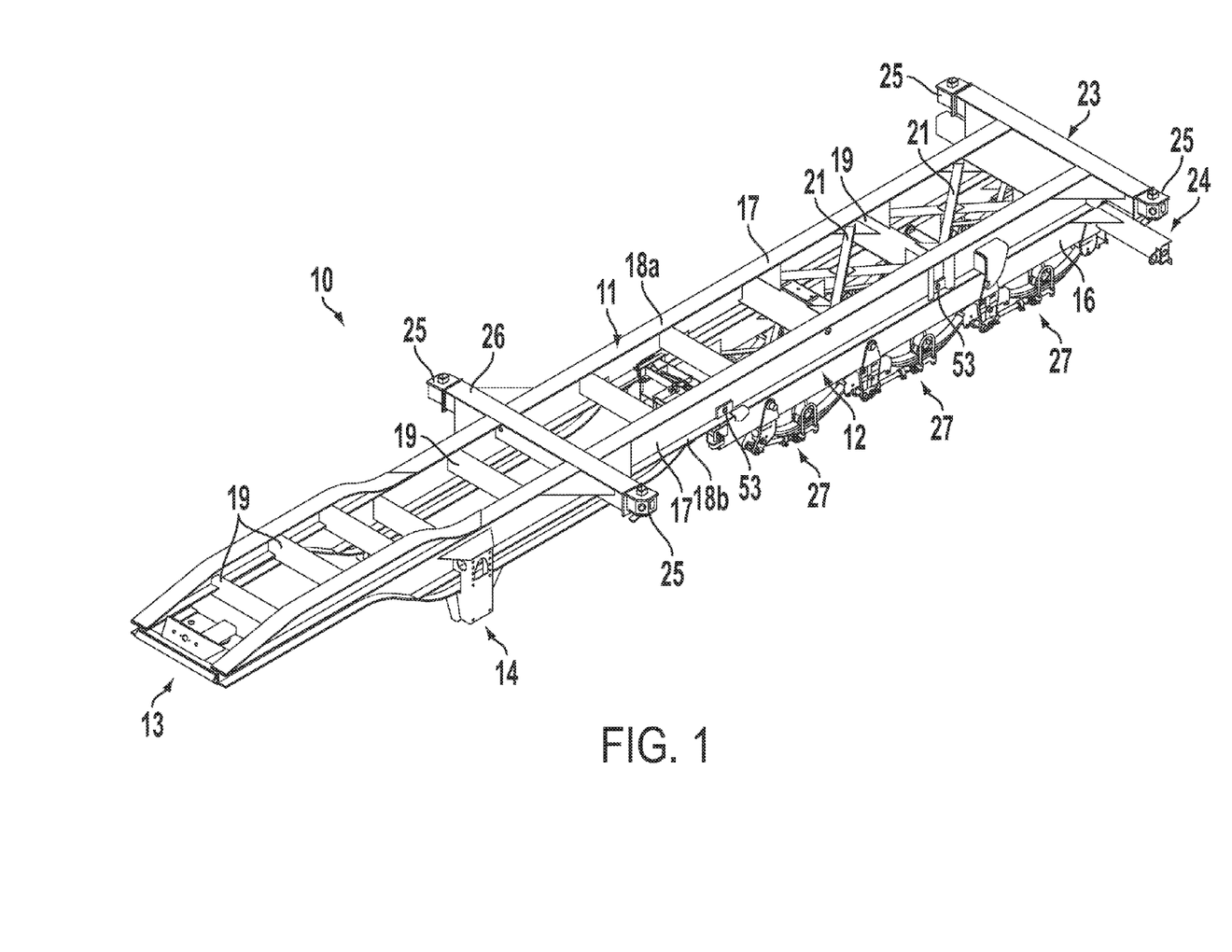
FIG. 1 is a front perspective view of the chassis in its retracted position.

Referring to the drawings for a better understanding of the function and structure of the invention, FIG. 1 shows the extendable chassis 10 having an upper frame 11 and a movable lower frame or "bogie" 12, the upper frame 11 of which supports various types of cargo containers. Chassis 10 includes a forward hitch area 13 which is used to connect the chassis 10 to a tractor (not shown) for hauling the chassis and cargo to a cargo destination, and a mount 14 to which is attached landing gear (not shown) to support the chassis 10 when detached from the tractor section. Both the upper frame 11 and bogie 12 include end assemblies 23, 24 respectively, and a cross beam assembly 26, each of which are integrally welded assemblies as is known. The upper frame 11 is principally comprised of two parallel "I-beam" members 17 that are robustly connected together with a series of cross support members 19 spaced at regular intervals along the length of the I-beams 17. At various locations between the I-beams, pairs of cross struts 21 are used to stiffen and strengthen the frame 11. Each I-beam includes upper and lower flanges 18a,b each having upper and lower surfaces used to connect the upper frame to the bogie, as will be discussed.

Beam assemblies 23 and 26 are spaced from one another and configured to accept and support a shipping container (not shown) at twist-lock end locations 25. Each twist-lock 25 is welded to an endplate flange in such a manner that beam assemblies 23 and 26 support the ends of the shipping container in a stable and fixed manner, while I-beams 17 support the underside of the container. For loading, a shipping container is lowered onto the chassis 10 with a crane, such as a reach stacker, so that the twist-lock receptacles positioned at the corners of the container are lowered over the correspondingly positioned twist-locks 25 on the upper frame. The twist-locks 25 are then manipulated to lock the container onto chassis 10, as is known in the art.

Figure 2:
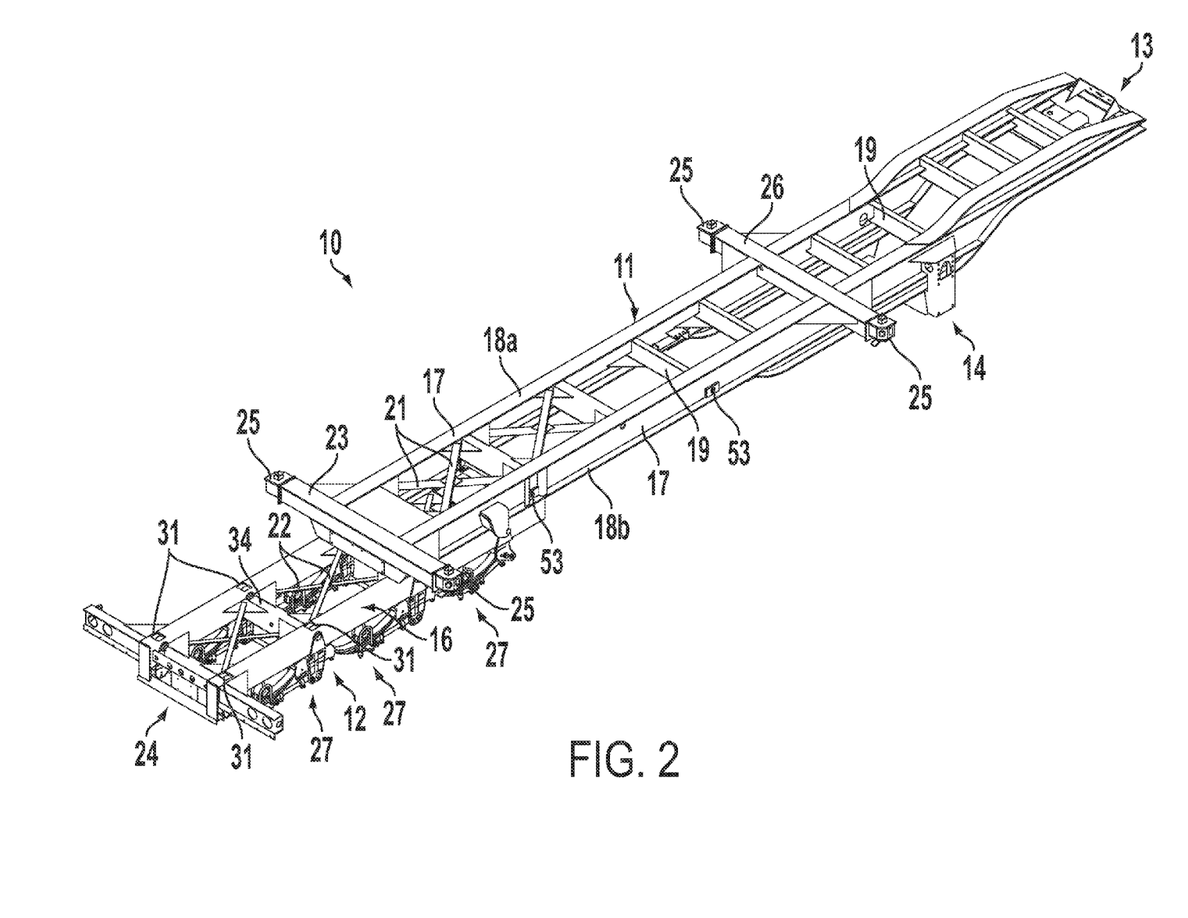
FIG. 2 is a rear perspective view of the chassis in its extended position.

FIG. 2 shows the chassis 10 in an extended position with the bogie 12 moved back from the upper frame 11 exposing a series of suspension assemblies 27 capable of receiving a set of axles and tires (not shown) for each assembly 27 to support the bogie and thereby the upper frame above a road pavement. The bogie includes two parallel rectangular support tubes 16 connected by a series of cross support members 34. A series of rollers 31 are embedded within the tubes 16 and have upper surfaces 32 that protrude through the upper surface of the tubes 16 at regular intervals as shown. Preferably, eight (8) rollers, four (4) on each side of the tubes 16, are positioned along the surface of the tubes 16 such that when extended four (4) are exposed to the rear of the upper frame 11 and four (4) support the lower surface of lower flange 18b and the frame 11, thereby.

Figure 3:
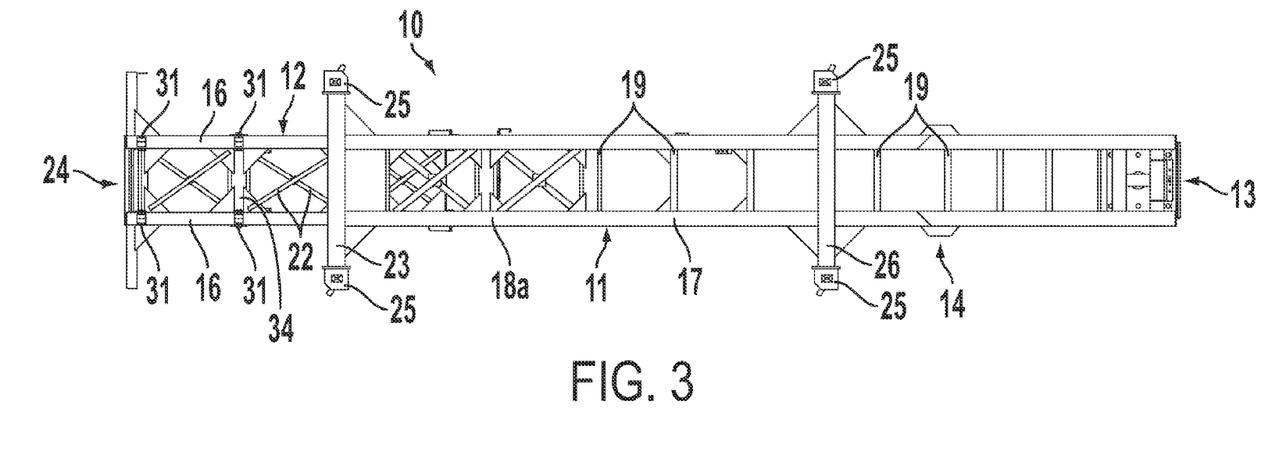
FIG. 3 is a plan view of the chassis.
Figure 4:
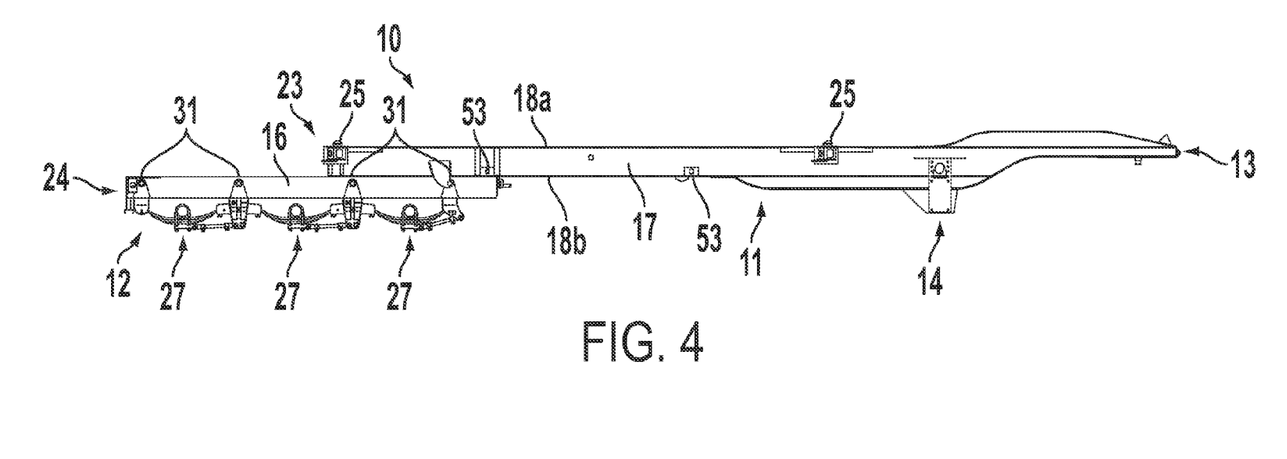
FIG. 4 is a side elevational view of the chassis in its extended position.
Figure 5:
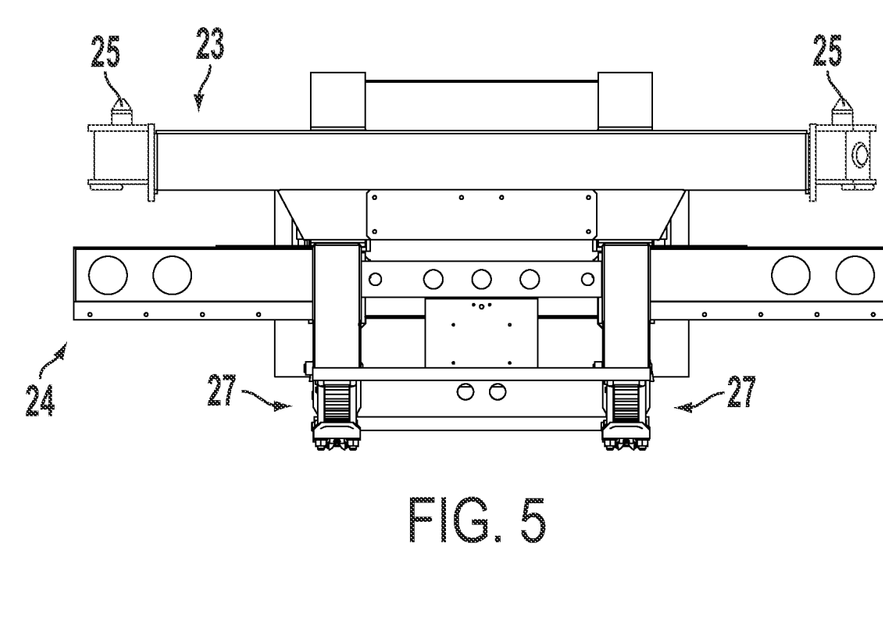
FIG. 5 is a rear elevational view of the chassis.

FIGS. 3 and 4 more clearly show the positioning of the suspension assemblies 27 and the eight (8) rollers 31 spaced along the tube 16. Four (4) of the eight (8) rollers are visible in FIG. 3, with the other four (4) rollers supporting the upper frame 11. As may be seen, the bogie 12 provides a significant expansion capability when extended while continuing to provide distributed road pavement support to the chassis 10. It will also be understood that the length of the bogie 12, the number of rollers 31, and the number of suspension assemblies 27 may be increased or decreased to accommodate various tire sizes and weight support goals for the chassis 10. Irrespective of the varying length of the bogie 12, a single standardized rear end 24 is utilized that has lights, reflectors, and license indicia as are known in the art (see FIG. 5). The end 23 of upper frame 11 and twist-locks 25 may also include such signal mechanisms to enhance visibility of the rear of the chassis during transport.

Figures 6, 6A:
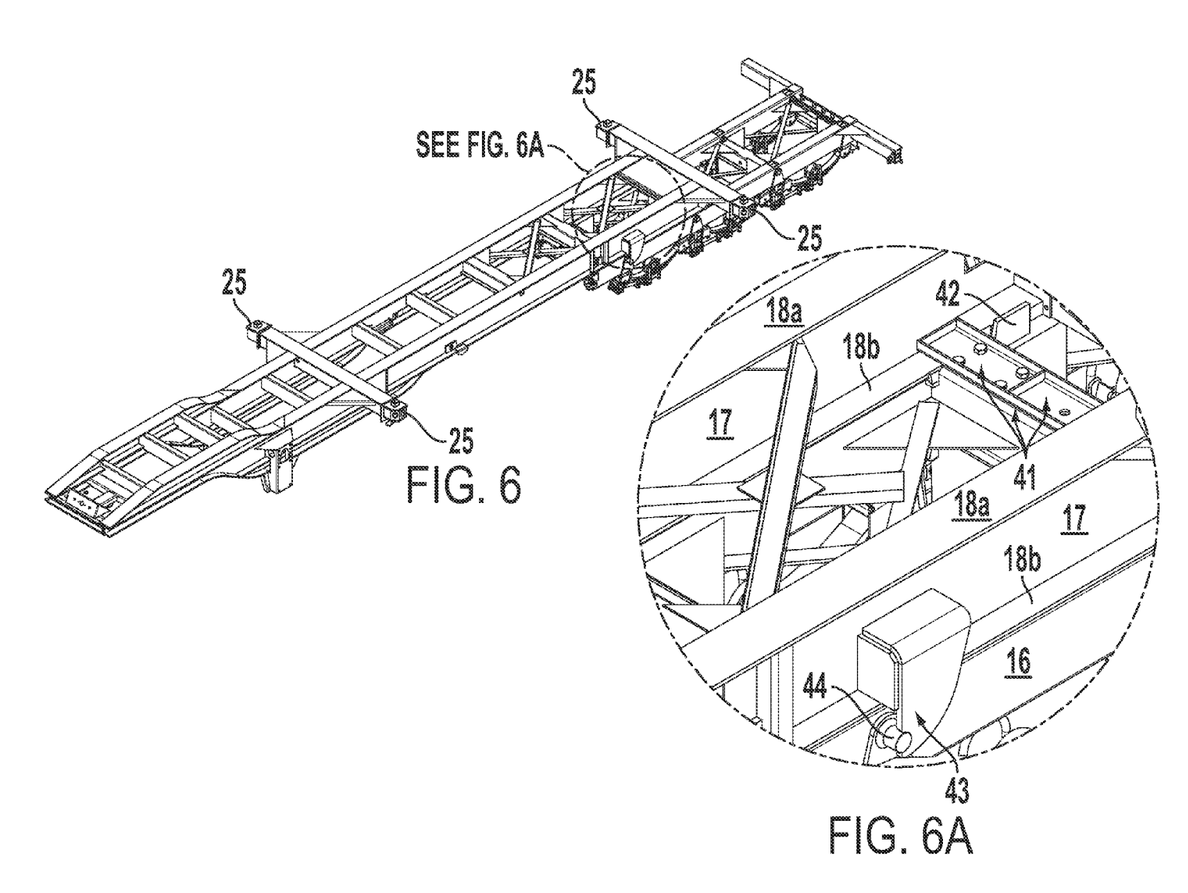
FIG. 6 is a front perspective view of the chassis showing the position of the stop catches and stop pins in the extended position.
FIG. 6A is a magnified view of the stop catch and pin circled in FIG. 6.
Figures 8, 8A:
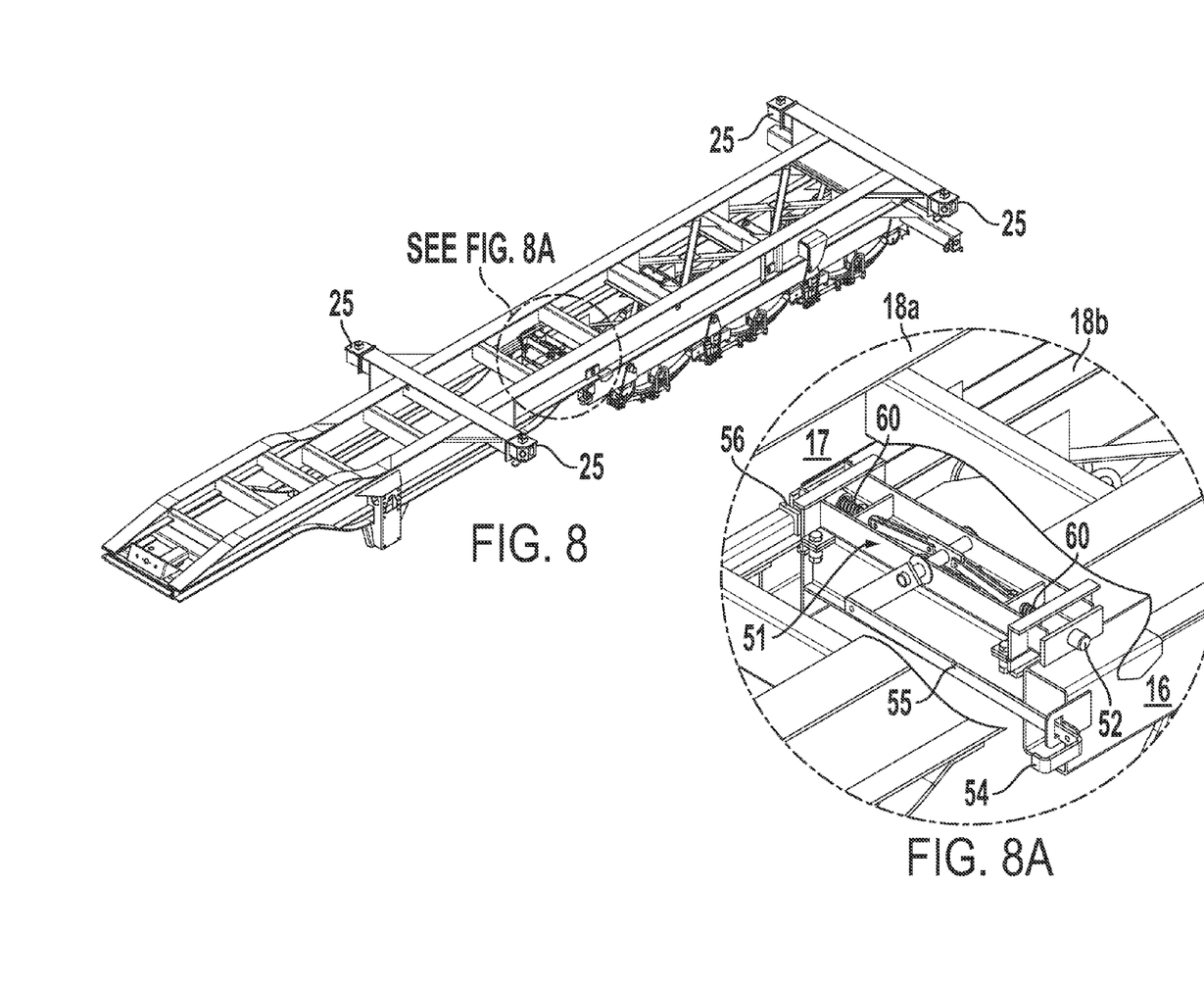
FIG. 8 is a front perspective view of the chassis showing the position of the bogie locking mechanism.
FIG. 8A is a magnified view of the locking mechanism circled in FIG. 8.

Referring now to FIGS. 6 and 6A, it may be seen that the bogie 12 includes several elements to allow the bogie to slide back from the upper frame 11 while continuing to support the frame when fully loaded with cargo. A locking mechanism 51 (see FIG. 8A) includes a pair of latch pins 52 that may be extended from between the support tubes 16 into locking engagement with a series of apertures 53 spaced along and through the I-beams 17 of upper frame 11. The locking mechanism 51 is configured to slide along the inside top surface of the lower flange 18b of I-beam 17, thereby locking the bogie 12 to the upper frame 11 as it slides rearward for expansion. A rear guide weldment 41 is affixed to and between the support tubes 16 of the bogie 12 and also configured to slide along the inside top surface of the lower flange 18b of I-beam 17. Weldment 41 is spaced a sufficient distance from the locking mechanism 51 so that together the bogie 12 and upper frame 11 are locked together in slidable engagement. A pair of stop blocks 42, a pair of rear stop catches 43, and a pair of fixed rear stop pins 44 are positioned on the I-beam 17 and support tube 16 so that the bogie 12 cannot be extended beyond a safe extension limit. As shown in FIG. 6, the bogie 12 is positioned at its maximum extension limit and the stop catch 43 affixed to the I-beam 17 bears against the pin 44 affixed to the support tube 16 so that further rearward movement is impossible. Simultaneously, block 42 bears against guide weldment 41 to further stop any rearward movement in like manner.

Figures 7, 7A:
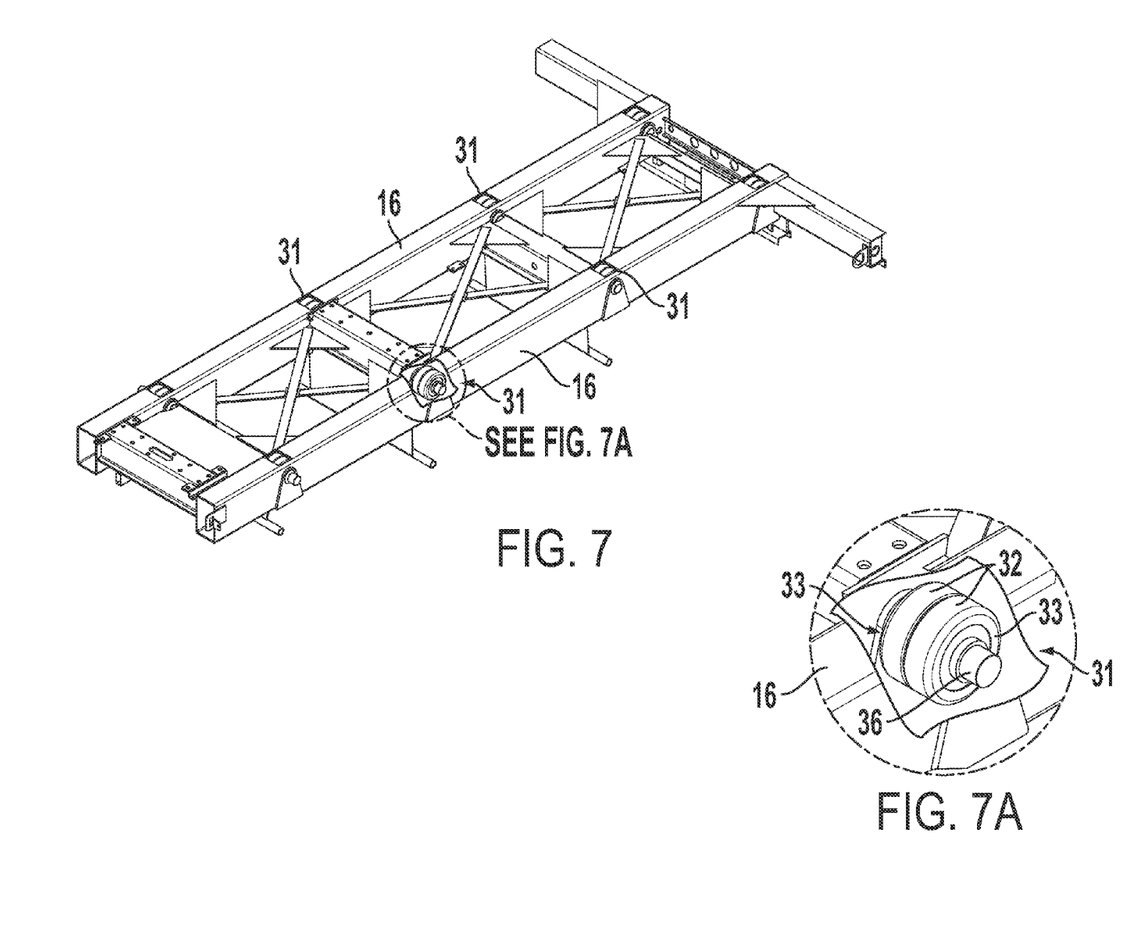
FIG. 7 is a perspective view of the bogie showing the position of the roller bearing assembly in the bogie support frame.
FIG. 7A is a magnified view of one of the roller assemblies circled in FIG. 7.
Figure 9A:
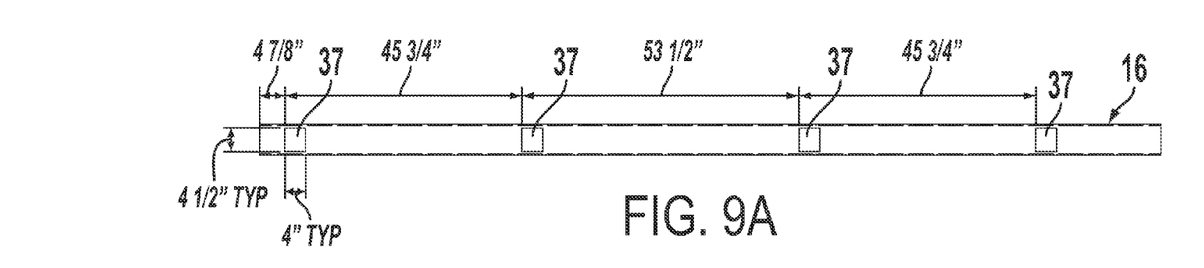
FIG. 9A is a plan view of one of the support frame tubes of the bogie.
Figure 9B:
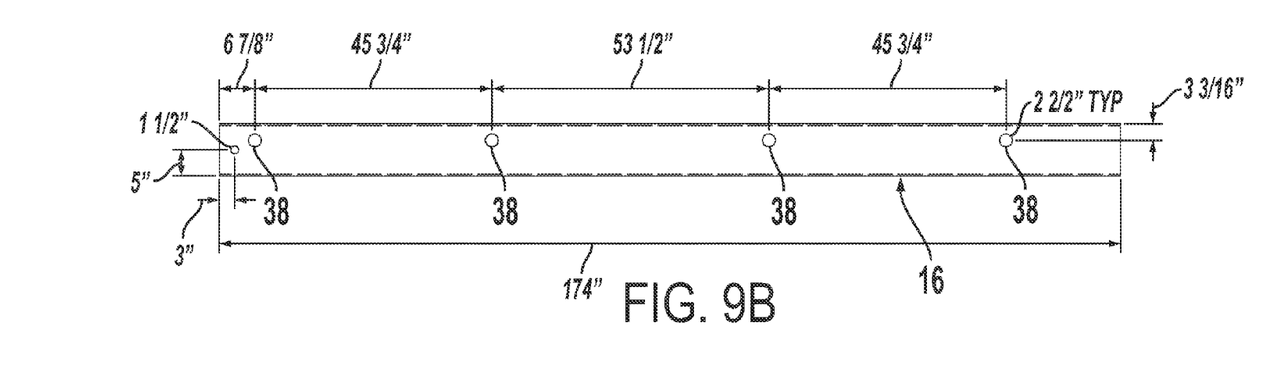
FIG. 9B is an elevational view of the support frame tube shown in FIG. 9A.
Figure 9C:
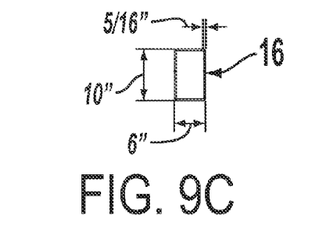
FIG. 9C is an end view of the support frame tube shown in FIG. 9A.

Referring to FIGS. 7 and 7A, it may be seen that a series of roller bearing assemblies 31 are embedded within support tubes 16 and have upper roller surfaces 32 that protrude through the support tube 16. Each roller assembly 31 includes a pin 36 that has ends affixed onto the inner surface of support tube walls 16 by having the pin ends positioned in holes 38 formed in the side walls of tube 16 (see FIG. 9B) and welded within them. A pair of bearings 33 are positioned next to one another and are pressed onto the pin 36. The support tubes 16 include rectangular openings 37 in the upper wall of the tubes 16 (see FIG. 9A) and the roller bearing assembly 31 is positioned so that each rolling surface 32 extends a small distance above the upper surface of each tube 16. The bearing assemblies 31 are positioned along the support tubes 16 (see FIG. 9B) so as to contact with and support the lower surface of the I-beam flange 18b as the bogie 12 is slid backwards and forwards in relation to the upper frame support 11. Suitable roller bearings may be obtained from The Timken Company, located in Canton, Ohio, under the part No. MG-5311-VFFA. The combination of the guide weldment 41, locking assembly 51, and roller assemblies 31 results in a vertically and laterally locked yet longitudinally slidable arrangement between the upper frame 11 and bogie 12.

Preferably, roller bearing assemblies 31 include free-rolling bearings, but the inventors anticipate that instead of roller bearings simple bushings (not shown) may be pressed onto pins 36 and suitable lubricants periodically applied to their surfaces such that upper frame 11 may be made to suitably slide against bogie 12.

Referring again to FIGS. 8 and 8A, to extend the bogie 12 from its retracted position into an extended position (or vice versa), an operator pulls a latch handle 54 away from the chassis 10 until a notch 55 in the handle engages a handle retainer housing, thereby securing the handle in an extended or open position. This retracts the latch pins 52 which had their ends extending through apertures 53 formed in I-beam 17. The operator then moves the tractor connected to the front end 13 backwards or forwards thereby moving the upper frame 11 relative to the bogie 12 to effect either an extended or retracted position, while also aligning the latch pins 52 within a selected aperture 53 along I-beam 17. The operator does this by locking the brakes of the bogie 12 while moving the tractor forward or backwards to adjust the distance of the bogie relative to the upper chassis frame 11. As the locking mechanism 51 begins moving relative to the upper frame, a latch release tab disengages the handle notch 55 so that once the desired relative positions are achieved, a pair of latch pin springs 60 force the pins 52 into the opposing apertures 53 at the lower edge of I-beam 17. With the pins 52 seated in apertures 53, bogie 12 is locked relative to upper frame 11 until an operator again releases the pins 52 with handle 54. It will be noticed that two opposing sets of apertures 53 are positioned within I-beam 17 at a distance that corresponds to the maximum extended position of bogie 12 relative to frame 11, and a retracted distance position of bogie 12 relative to frame 11 (See FIGS. 1, 2, and 4).

While I have shown my invention in one form, it will be obvious to those skilled in the art that it is not so limited but is susceptible of various changes and modifications without departing from the spirit thereof.

Having set forth the nature of the invention, what is claimed is:

1. An extendable truck chassis, comprising:
    a. an upper frame having a longitudinal support bed for supporting a shipping container and a rearward end, a pair of support members traversing said support bed and sized for reception of said shipping container proximate to the ends of said shipping container, and means positioned on said support members for locking said container to said upper frame;
    b. a bogie slidably connected to said upper frame at a lower portion thereof, said bogie including a frame and a wheel assembly, said frame including a plurality of cross members;
    c. a plurality of support bearings positioned within said bogie frame within said cross members, wherein each said support bearing has an upper portion extending above said frame for slidable engagement with said upper frame; and,
    d. wherein said bogie is adapted to slidably move under said rearward portion of said upper frame from a first position to a second position such that said second position extends the length of said chassis with said bogie supporting said same.

2. A chassis as recited in claim 1, said bogie further including a pair of parallel support tubes spaced from one another and connected with a plurality of cross support members, said support tubes further defining a plurality of rectangular apertures positioned at regular intervals along an upper surface of said support tubes, wherein each of said rectangular apertures is sized smaller than any of said support bearings, and wherein each said bearing is mounted within one of said support tubes and has an upper surface portion extending through at least one of said apertures.

3. A chassis as recited in claim 2, wherein said support bearing comprises a mast guide bearing supported by a pin extending through said support bearing and having its ends welded into apertures formed in said support tubes.

4. A chassis as recited in claim 3, wherein said longitudinal support bed comprises a pair of parallel I-beams spaced from one another, and wherein said bogie includes at least one guide weldment spanning said support tubes and having a portion bearing against an upper surface of a lower portion of said I-beam such that said bogie is slidably locked to said upper frame.

5. A chassis as recited in claim 4, further including a locking assembly positioned between said support tubes and including at least one pin movable from a locked to an unlocked position, wherein said upper frame defines at least two apertures, one positioned for an extended position and one positioned for a retracted position for said bogie relative to said upper frame, and wherein said locking assembly is arranged for locking engagement of said at least one pin within a respective one of said at least two apertures when said bogie is moved to an extended position or a retracted position.

6. A chassis as recited in claim 5, wherein said locking assembly further includes a release handle for releasing said locking pin and holding it in an unlocked position, and wherein said locking assembly is further adapted to automatically release said locking pin from an unlocked position to a locked position upon said pin moving into one of said apertures.

7. A chassis as recited in claim 6, wherein each said support tube includes at least one stop pin for limiting the movement of said bogie relative to said upper frame.

8. A chassis as recited in claim 1, wherein said support bearings include bushings for slidably supporting said upper frame.

9. A chassis as recited in claim 8, wherein said container locking means comprises a twist-lock.

10. A chassis as recited in claim 1, further including a locking assembly positioned between said pair of support members and including at least one pin movable from a locked to an unlocked position, wherein said upper frame defines at least two apertures, one positioned for an extended position and one positioned for a retracted position for said bogie relative to said upper frame, and wherein said locking assembly is arranged for locking engagement of said at least one pin within a respective one of said at least two apertures when said bogie is moved to an extended position or a retracted position.

11. A chassis as recited in claim 10, wherein said support bearing comprises a mast guide bearing supported by a pin extending through said support bearing and having its ends welded into apertures formed in said support tube.

12. A chassis as recited in claim 1, wherein said support bearings comprise bushings for slidably supporting said upper frame.

13. A chassis as recited in claim 12, further including a locking assembly positioned within said bogie frame and including at least one pin movable from a locked to an unlocked position, wherein said upper frame defines at least two apertures, one positioned for an extended position and one positioned for a retracted position for said bogie relative to said upper frame, and wherein said locking assembly is arranged for locking engagement of said at least one pin within a respective one of said at least two apertures when said bogie is moved to an extended position or a retracted position.

14. A chassis as recited in claim 13, wherein said longitudinal support bed comprises a pair of parallel I-beams spaced from one another, and wherein said bogie includes at least one guide weldment within said bogie frame, said weldment having a portion bearing against an upper surface of a lower portion of said I-beam such that said bogie is slidably locked to said upper frame.

15. An extendable truck chassis, comprising:
 a. upper frame means for supporting support bed and for supporting a shipping container positioned on said support bed, said upper frame means further including a rearward end, a pair of support members traversing said support bed and sized for reception of said shipping container proximate to the ends of said shipping container, and means positioned on said support members for locking said container to said upper frame means;
 b. means slidably connected to said upper frame means at a lower portion thereof for supporting said same, said support means including at least one wheel assembly for travel over a road surface and a plurality of cross members for strengthening said support means;
 c. a plurality of roller means positioned within said support means, each said roller means positioned within at least one cross member and each said roller means having an upper portion extending above said upper frame means for slidable engagement with said upper frame means; and,
 d. wherein said support means is adapted to slidably move under said rearward portion of said upper frame means from a first position to a second position such that said second position extends the length of said chassis with continuous support of said upper frame means above a road surface.

16. A chassis as recited in claim 15, said support means further including a pair of parallel support tubes spaced from one another and connected with a plurality of cross support members, said support tubes further defining a plurality of rectangular apertures positioned at regular intervals along an upper surface of said support tubes, wherein each of said rectangular apertures is sized smaller than any of said roller means, and wherein each said roller means is mounted within one of said support tubes and has an upper surface portion extending through at least one of said apertures.

17. A chassis as recited in claim 16, further including a locking assembly positioned between said support tubes and including at least one pin movable from a locked to an unlocked position, wherein said upper frame means defines at least two apertures, one positioned for an extended position and one positioned for a retracted position for said support means relative to said upper frame means, and wherein said locking assembly is arranged for locking engagement of said at least one pin within a respective one of said at least two apertures when said support means is moved to an extended position or a retracted position.

18. A chassis as recited in claim 17, wherein said roller means comprises a mast guide bearing supported by a pin extending through said roller means and having its ends welded into apertures formed in said support tube.

19. A chassis as recited in claim 15, wherein said longitudinal support bed comprises a pair of parallel I-beams spaced from one another, and wherein said support means includes at least one guide weldment spanning said support tubes and having a portion bearing against an upper surface of a lower portion of said I-beam such that said support means is slidably locked to said upper frame means.

20. A chassis as recited in claim 19, said support means further including a pair of parallel support tubes spaced from one another and connected with a plurality of cross support members, said support tubes further defining a plurality of rectangular apertures positioned at regular intervals along an upper surface of said support tubes, wherein each of said rectangular apertures is sized smaller than any of said roller means, and wherein each said roller means is mounted within one of said support tubes and has an upper surface portion extending through at least one of said apertures.

21. A chassis as recited in claim 20, wherein said roller means comprises a mast guide bearing supported by a pin extending through said roller means and having its ends welded into apertures formed in said support tubes.

22. An extendable truck chassis, comprising:
   a. a first chassis frame having one end adapted for connection to a truck tractor and a rear end, said first frame including at least a pair of twist-locks affixed thereto and configured for receiving and locking a shipping container placed upon said first frame;
   b. a second chassis frame having a portion positioned underneath said first chassis frame and slidably connected thereto, said second chassis including at least two wheel assemblies for rollably supporting said second chassis frame underneath said first chassis frame, and a pair of support tubes connected to one another via a plurality of cross members and positioned in spaced parallel relation thereof, and a locking plate supported by and spanning said support tubes, said locking plate bearing against a lower portion of said first chassis such that said second chassis is slidably locked against said first chassis;
   c. at least two support bearings positioned within each said support tube and each said support bearing embedded within at least one of said cross members for rotationally supporting said first chassis frame;
   d. a locking assembly positioned between said support tube and including at least one pin movable from a locked to an unlocked position; and,
   e. wherein said first chassis frame defines at least two apertures, one positioned for an extended position and one positioned for a retracted position for said second chassis frame relative to said first chassis frame, and wherein said locking assembly is arranged for locking engagement of said at least one pin within said at least two apertures when said second chassis frame is moved to an extended position or to a retracted position.

* * * * *